(12) United States Patent
LeBeau et al.

(10) Patent No.: US 8,244,544 B1
(45) Date of Patent: *Aug. 14, 2012

(54) EDITING VOICE INPUT

(75) Inventors: Michael J. LeBeau, Palo Alto, CA (US);
John Nicholas Jitkoff, Palo Alto, CA (US); William J. Byrne, Davis, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/248,849

(22) Filed: Sep. 29, 2011

Related U.S. Application Data

(63) Continuation of application No. 12/851,894, filed on Aug. 6, 2010.

(51) Int. Cl.
*G10L 21/00* (2006.01)
(52) U.S. Cl. .......... 704/275; 704/235; 704/257
(58) Field of Classification Search ........ 704/1–10, 704/251, 252, 253, 254, 257, 270, 235, 231, 704/275, 270.1
See application file for complete search history.

(56) References Cited

U.S. PATENT DOCUMENTS

| | | | |
|---|---|---|---|
| 6,839,669 B1 * | 1/2005 | Gould et al. ............ | 704/246 |
| 7,130,401 B2 | 10/2006 | Rampey et al. | |
| 7,136,462 B2 | 11/2006 | Pelaez et al. | |
| 7,406,657 B1 * | 7/2008 | Callaghan et al. ........... | 715/225 |
| 8,065,143 B2 * | 11/2011 | Yanagihara ................... | 704/235 |
| 2002/0133342 A1 | 9/2002 | McKenna | |
| 2003/0097262 A1 | 5/2003 | Nelson | |
| 2003/0158722 A1 | 8/2003 | Lord | |
| 2009/0048832 A1 | 2/2009 | Terao | |
| 2009/0070109 A1 | 3/2009 | Didcock et al. | |
| 2010/0223055 A1 * | 9/2010 | Mclean ........................ | 704/235 |
| 2010/0324894 A1 | 12/2010 | Potkonjak | |
| 2011/0195739 A1 | 8/2011 | Deleus et al. | |

OTHER PUBLICATIONS

Office Action from corresponding U.S. Appl. No. 12/851,894, dated Nov. 8, 2011.

* cited by examiner

*Primary Examiner* — Huyen X. Vo
(74) *Attorney, Agent, or Firm* — Fish & Richardson P.C.

(57) ABSTRACT

A computer-implemented method of generating a voice command to perform an action includes receiving a voice request to perform the action, wherein the voice request comprises first audio information for one or more first data fields associated with the action; generating a GUI that when rendered on a display device comprises a prompt message prompting a user to speak second audio information for one or more second data fields associated with the action; and inserting into the one or more second data fields data indicative of one or more of (i) the first audio information, and (ii) the second audio information.

24 Claims, 9 Drawing Sheets

EDITING VOICE INPUT

CROSS-REFERENCE TO RELATED APPLICATIONS

This application is a continuation of U.S. patent application Ser. No. 12/851,894, filed Aug. 6, 2010, which is incorporated herein in its entirety.

TECHNICAL FIELD

This patent application relates generally to editing voice input and using the edited voice input in performance of an action, such as sending an email.

BACKGROUND

Speech-to-text (STT) applications convert spoken words to text. STT systems include an electronic device (e.g., a microphone) to record voice input, and a synthesizer to transform the voice input to a sound file. Data in the sound file is parsed and compared to vocabulary lists (e.g., an electronic dictionary) to convert the data in the sound file to text information.

SUMMARY

In one aspect of the present disclosure, a computer-implemented method of generating a voice command to perform an action includes receiving a voice request to perform the action, wherein the voice request comprises first audio information for one or more first data fields associated with the action; generating a graphical user interface ("GUI") that when rendered on a display device comprises a prompt message prompting a user to speak second audio information for one or more second data fields associated with the action; and inserting into the one or more second data fields data indicative of one or more of (i) the first audio information, and (ii) the second audio information.

Implementations of the disclosure may include one or more of the following features. In some implementations, the action is associated with a set of data fields, and the method further includes: determining that the first audio information for the one or more first data fields includes a partial set of information for the data fields in the set of data fields. In other implementations, the action is associated with a set of data fields, and the method further includes: determining that the first audio information for the one or more first data fields and the second audio information for the one or more second data fields comprise a complete set of information for the data fields in the set of data fields.

In still other implementations, the method further includes determining, based on the voice request, a syntax format to be used in performing the action, wherein the syntax format comprises one or more syntax fields; retrieving, from a data repository, one or more syntax rules; applying the one or more syntax rules to at least one of (i) the first audio information for the one or more first data fields, and (ii) the second audio information for the one or more second data fields; and generating, based on applying, a mapping between the one or more syntax fields in the syntax format and at least one of (i) the first audio information for the one or more first data fields, and (ii) the second audio information for the one or more second data fields.

The method may also include determining, based on the voice request, a syntax format to be used in performing the action, wherein the syntax format comprises one or more syntax fields; and generating syntax information, with the syntax information at least partly based on one or more of (i) the first audio information for the one or more first data fields, and (ii) the second audio information for the one or more second data fields. In some implementations, the method may include determining, based on the syntax information, one or more incomplete syntax fields; and generating, based on the one or more incomplete syntax fields, one or more training actions to train a user to speak a complete syntax associated with the action. At least one of the one or more training actions may include an action to generate a GUI that when rendered on a display device displays a highlighted visual representation of at least one of the one or more incomplete syntax fields. The one or more second data fields associated with the action may include the one or more incomplete syntax fields.

In another aspect of the disclosure, one or more machine-readable media are configured to store instructions that are executable by one or more processing devices to perform functions including: receiving a voice request to perform the action, wherein the voice request comprises first audio information for one or more first data fields associated with the action; generating a GUI that when rendered on a display device comprises a prompt message prompting a user to speak second audio information for one or more second data fields associated with the action; and inserting into the one or more second data fields data indicative of one or more of (i) the first audio information, and (ii) the second audio information. Implementations of this aspect of the present disclosure can include one or more of the foregoing features.

In still another aspect of the disclosure, an electronic system for generating a voice command to perform an action, includes one or more processing devices; and one or more machine-readable media configured to store instructions that are executable by the one or more processing devices to perform functions including: receiving a voice request to perform the action, wherein the voice request comprises audio information for one or more first data fields associated with the action; generating a GUI that when rendered on a display device comprises a prompt message prompting a user to speak audio information for one or more second data fields associated with the action; and inserting into the one or more second data fields data indicative of one or more of (i) the first audio information, and (ii) the second audio information. Implementations of this aspect of the present disclosure can include one or more of the foregoing features.

In yet another aspect of the disclosure, an electronic system for generating a voice command to perform an action includes an electronic voice input device; a voice editor manager configured to: receive and to interpret a user voice input into the electronic voice input device; and to determine, based on the user voice input, one of more incomplete data fields associated with the action; means for providing, from the voice editor manager to the electronic voice input device, a prompt message that prompts a user of the electronic system to speak information for the one or more incomplete fields; and means for generating the voice command based on the user voice input and the information for the one or more incomplete fields. Implementations of this aspect of the present disclosure can include one or more of the foregoing features.

Any two or more of the features described in this patent application, including this summary section, may be combined to form embodiments not specifically described in this patent application.

The details of one or more examples are set forth in the accompanying drawings and the description below. Further features, aspects, and advantages will become apparent from the description, the drawings, and the claims.

DESCRIPTION OF DRAWINGS

Like reference symbols in the various drawings indicate like elements.

DETAILED DESCRIPTION

Described herein is a system in which a user of a mobile device provides voice input (e.g., through a microphone associated with the mobile device) for a type of action (e.g., sending of an email, a text message, and so forth) to be performed. A server generates a GUI that includes a visual representation of the voice input. Through the GUI, the user may provide additional voice input associated with the action (e.g., to whom an email should be sent) and/or may edit the voice input already provided (e.g., send a Short Message Service ("SMS") message rather than an email). Advantageously, the described system may provide for one or more benefits, such as enabling a user to edit voice input that is used in performing an action, such as sending an email.

Figure 1:
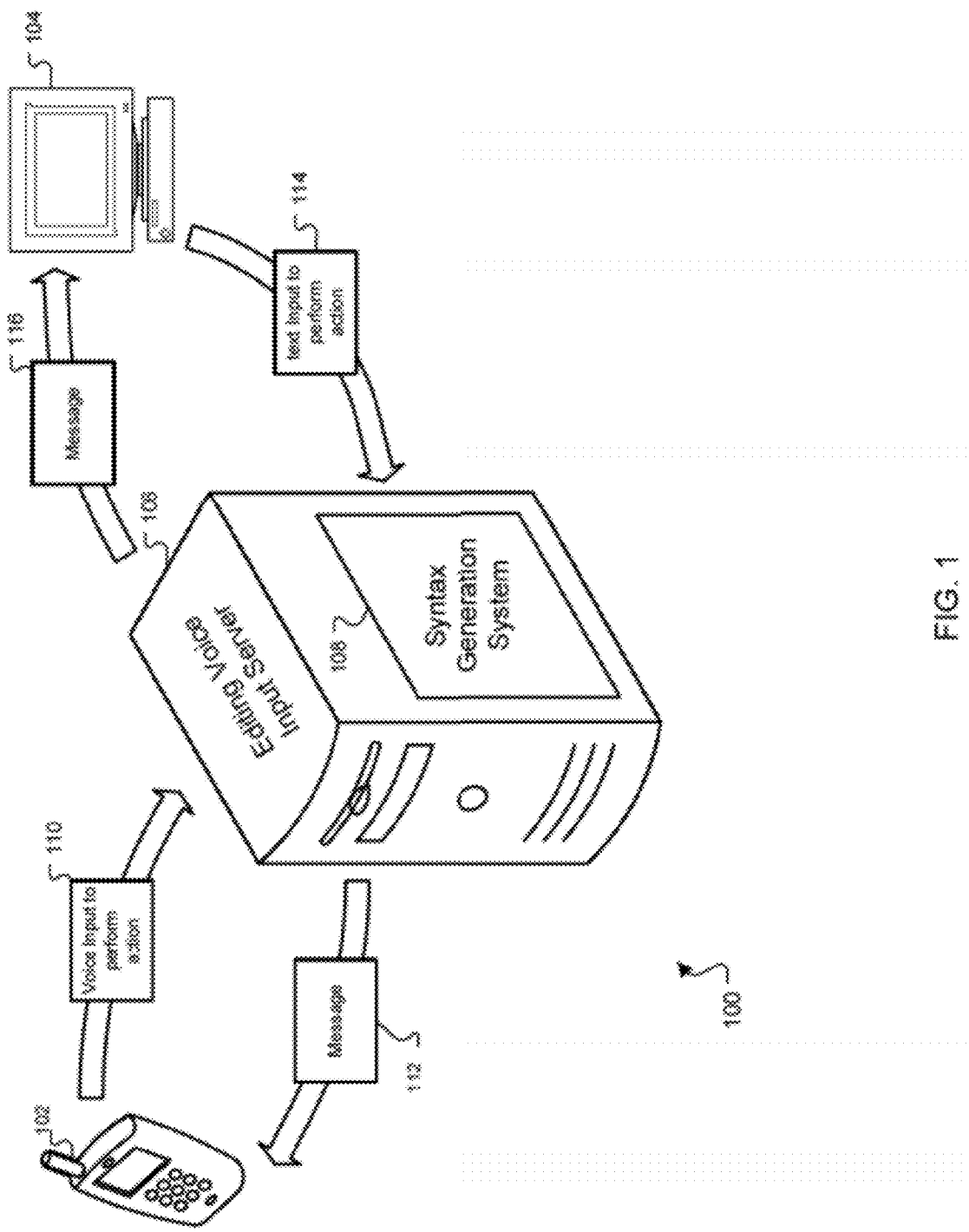
FIG. 1 is a conceptual diagram of a system for editing voice input.

FIG. 1 is a conceptual diagram of system 100 for editing voice input. System 100 includes client device 102 (e.g., a smart phone, a mobile device, and so forth) and computing device 104 (e.g., a personal computer, a laptop computer, and so forth) that are configured to receive voice input. The voice input may include information that is associated with an action. For example, the voice input may include a "send email" action. Voice input may also include name information for a recipient of the email, subject information, and carbon copy ("cc") recipient information. The voice input, including the type of action and information associated with the action, is sent to editing voice input server 106.

System 100 also includes editing voice input server 106, which is configured to parse voice input to determine a "syntax action", e.g., a listing and format of data fields associated with an action and/or an ordering of data fields (referred to herein as "syntax fields," without limitation and for the purposes of convenience) associated with the action. Editing voice input server 106 populates at least some of the syntax fields with "syntax information" (e.g., information associated with a syntax field) derived from information included in the voice input.

Editing voice input server 106 includes syntax generation system 108 to perform speech to text conversion on the received voice input and to retrieve an appropriate template for the syntax action, as described herein. In an example, client device 102 receives voice input from a user of client device 102, e.g., by the user speaking into a microphone (not shown) on client device 102. Client device 102 generates voice input message 110 and sends voice input message 110 to editing voice input server 106. Based on information in voice input message 110, syntax generation system 108 determines the appropriate syntax action, populates syntax fields associated with the syntax action with syntax information, and generates a GUI including the syntax fields with the syntax information. Editing voice input server 106 sends client device 102 message 112 including data for generating the GUI. Accordingly, a GUI including the syntax information is displayed on client device 102. Through the GUI, the user may edit the syntax information in the populated syntax fields and/or input new information into syntax fields.

Editing voice input server 106 also receives input from a user of computing device 104, e.g., by the user entering text on a keyboard associated with computing device 104. Computing device 104 generates text input message 114 and sends text input message 114 to editing voice input server 106. Based on information in text input message 114, syntax generation system 108 determines an appropriate syntax action, populates the syntax fields with syntax information, and generates a GUI including the syntax fields with the syntax information. Editing voice input server 106 sends computing device 104 message 116 including the GUI data. The GUI is displayed on computing device 104. Through the GUI, the user edits (e.g., by voice input, by text input, and so forth) the syntax information in the populated syntax fields and/or inputs new information into the incomplete syntax fields to be used in performance of the action, e.g., sending of an email.

Editing voice input server 106 also identifies "incomplete" syntax fields, syntax fields that are not associated with syntax information. Based on the incomplete syntax fields, editing voice input server 106 generates training actions to train the user how to provide a complete voice command to perform an action.

As described herein, editing voice input server 106 generates a GUI that displays for the user the syntax action, in which visual representations of the syntax fields are populated with syntax information. Editing voice input server 106 also prompts the user to provide edited voice input for the incomplete syntax fields, for example, to train the user to complete these syntax fields. Additionally, through the GUI, the user may edit the syntax information in "complete" syntax fields (e.g., syntax fields that are populated with syntax information) by providing edited voice input (e.g., by speaking or entering text) for the complete syntax fields. Based on the edited voice input, editing voice input server 106 populates the complete and incomplete syntax fields with syntax information corresponding to the edited voice input. Editing voice input server 106 generates a data file including the syntax action and sends the data file to client device 102, where the action may be executed based on the syntax information and the type of syntax action to be performed.

In an example, the user provides initial voice input by speaking the phrase "send email to John Hamilton" into a microphone on client device 102. Based on the initial voice input, editing voice input server 106 determines that the type of syntax action is "send email" and the syntax action includes the following format: "send email to [recipient name] with carbon copy (or cc) to [cc recipient name] and blind copy (or bcc) to [bcc recipient name] with body of [body text]."

In this example, the "send email" syntax action includes four syntax fields: a recipient name syntax field, a cc recipient name syntax field, a bcc recipient name syntax field, and a body text syntax field. Based on the initial voice input, editing voice input server 106 inserts syntax information of "John Hamilton" into the recipient name syntax field. Editing voice input server 106 generates a GUI that displays, for the user, the syntax action with the recipient name syntax field populated with the relevant syntax information. In this example, the GUI displays the following sentence: send email to John Hamilton with carbon copy (or cc) to [cc recipient name] and blind copy (or bcc) to [bcc recipient name] with body of [body text]. Through the GUI, the user is notified of the incomplete syntax fields (e.g., the cc recipient name syntax field, the bcc recipient name syntax field, and the body text syntax field) by visual notifications, including highlighting of the incomplete syntax fields, and providing a bubble around the incomplete syntax fields. The user may enter syntax information into the incomplete syntax fields and/or edit the syntax information in the syntax fields populated with syntax information.

Figure 2:
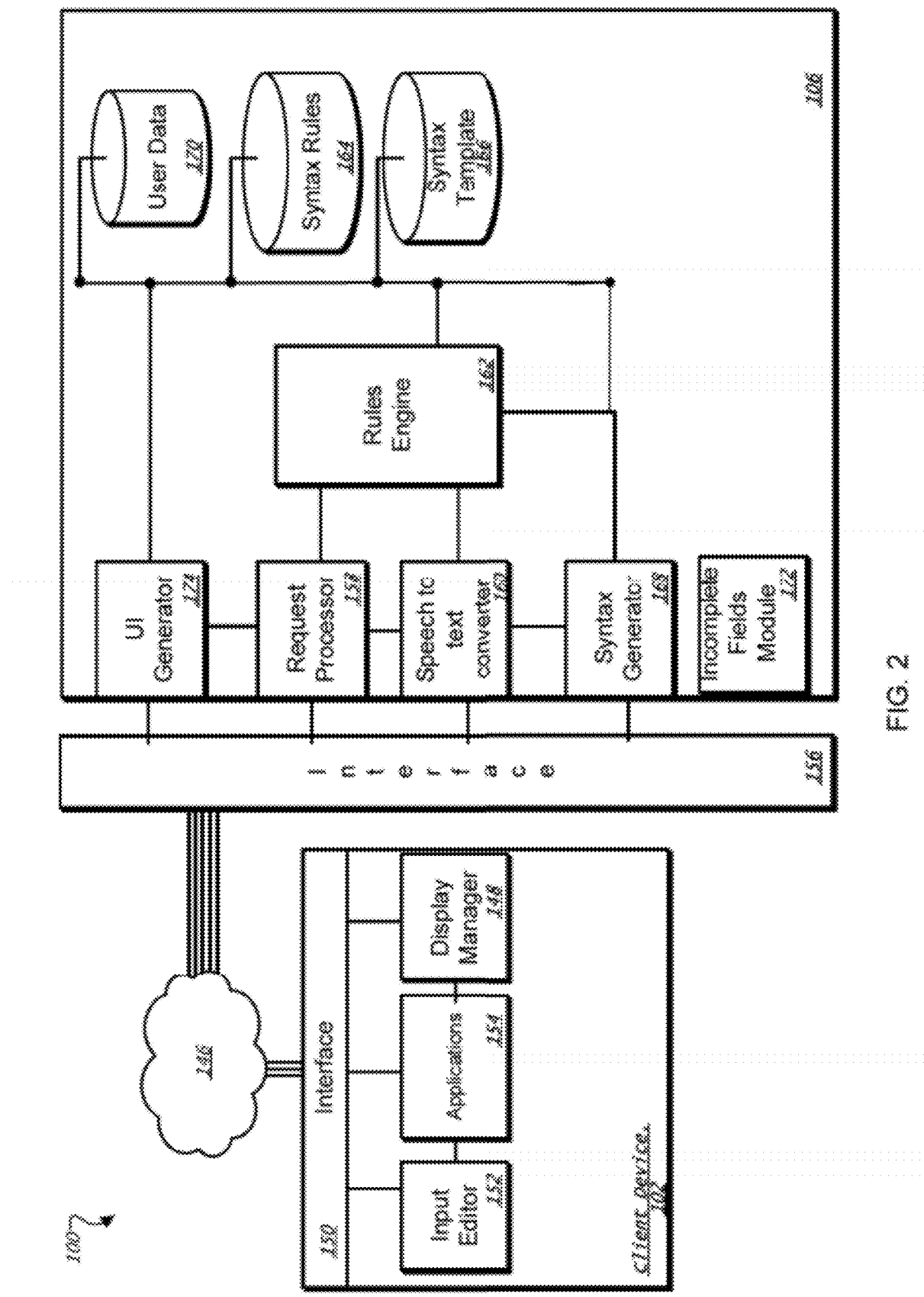
FIG. 2 is a block diagram of components of the system for editing voice input.

FIG. 2 is a block diagram of components of system 100 for editing voice input. System 100 depicts editing voice input server 106 that is capable of receiving edited voice input to insert into syntax fields. Editing voice input server 106 can receive voice input from client device 102 over network 146. Client device 102 can be any sort of computing device capable of taking input from a user and communicating over network 146 with editing voice input server 106. For example, client device 102 can be a mobile device, a desktop computer, a laptop, a cell phone, a personal digital assistant ("PDA"), a server, an embedded computing system, and so forth.

Client device 102 includes display manager 148. Display manager 148 may track and record a location on a GUI (e.g., displayed on client device 102) in which a user is entering text information or selecting a link.

Client device 102 includes input editor 152. Input editor 152 may control the handling of data that is received from a user via a microphone, touchscreen or other input mechanism on client device 102. For example, input editor 152 may coordinate with display manager 148 to identify where, on a GUI displayed on client device 102, a user is entering information so that that input editor 152 may understand the context of the input. For example, a user may edit a syntax field of the syntax action "send email" by selecting a "speak audio" button associated with the syntax field. Display manager 148 records the location of the selected button on the GUI and passes the recorded location information to input editor 152 to enable input editor 152 to determine the syntax field for which voice input is being edited by the user. Additionally, input editor 152 may determine which application or applications 154 should be provided with the edited voice input. For example, when voice input is edited for a syntax field of an active application, the edited voice input is made available to the active application.

Input editor 152 transmits voice input from client device 102 to editing voice input server 106 via an input/output (I/O) interface 150. I/O interface 150 can be any type of interface capable of communicating with editing voice input server 106 over network 146, such as an Ethernet interface, a wireless networking interface, a fiber-optic networking interface, a modem, and so forth.

Network 146 can be any of a variety of networks over which client device 102 and editing voice input server 106 can communicate. For example, network 146 may include a mobile network, a local area network (LAN), a wide area network (WAN), the Internet, an intranet, a wireless network, a point-to-point network, and so forth. Network 146 transmits voice input from client device 102 to editing voice input server 106.

Editing voice input server 106 can be any of a variety of computing devices capable of receiving voice input, such as a server, a distributed computing system, a desktop computer, a laptop, a cell phone, a rack-mounted server, and so forth. Editing voice input server 106 can receive voice input information from client device 102 via network 146 at I/O interface 156 for editing voice input server 106. I/O interface 156 provides the voice input to request processor 158. Request processor 158 formats the voice input for processing by speech to text converter 160. Speech to text converter 160 parses the voice input and converts the voice input to a text file. Speech to text converter 160 passes the text file to rules engine 162. Rules engine 162 accesses syntax rules data repository 164 to retrieve one or more "syntax rules," rules that determine an appropriate syntax action based on information in the text file.

For example, a syntax rule includes the following rule: if text file includes "email," then syntax action=="Send email." In this example, the voice input corresponds to "send email to John Hamilton." Editing voice input server 106 applies STT conversion to generate a text file including the phrase "send email to john hamilton." In this example, based on execution of the syntax rules, rules engine 162 selects a syntax action of "send email."

Rules engine 162 also accesses syntax template data repository 166 to retrieve a "syntax template" associated with the syntax action. A syntax template may include a file with a format (e.g., a textual format, a syntax field format, and so forth) for the syntax action. For example, the syntax template for the "send email" syntax action includes the sentence "send email to [recipient name] with carbon copy (or cc) to [cc recipient name] and blind copy (or bcc) to [bcc recipient name] with body of [body text]."

In an example, syntax template data repository 166 includes a table mapping syntax templates to syntax actions, an example of which is provided in Table 1 below.

TABLE 1

| Syntax Action | Syntax Template |
| --- | --- |
| Send Email | Send Email template |
| Send SMS message | Send SMS message template |
| Forward Email | Forward Email template |

Rules engine 162 retrieves a syntax template from syntax template data repository 166. Rules engine 162 passes the retrieved syntax template to syntax generator 168 to generate the syntax action by populating the syntax fields of the syntax template. That is, by populating the syntax fields of the syntax template, syntax generator 168 generates a command to perform an action.

Syntax generator 168 also receives the text file from speech-to-text converter 160. By comparing the contents of the text file to the location of the syntax fields in the syntax template, syntax generator 168 extracts syntax information from the text file and populates syntax fields in the syntax template with the syntax information. In an example, the text file includes the text "send email to John Hamilton" and the send email template includes "Send email to [recipient name] with carbon copy (or c.c.) to [cc recipient name] and blind copy (or b.c.) to [b.c. recipient name] with body of [body text]." By comparing the location of the words "John Hamilton" in the text file to the location of the recipient name syntax field in the syntax template, syntax generator 168 determines that "John Hamilton" includes syntax information corresponding to the recipient name syntax field. In this example, syntax generator 168 populates the recipient name syntax field with the "John Hamilton" syntax information.

User data repository 170 stores user information, e.g., name information, date of birth information, email addresses of common contacts, and so forth. Syntax generator 168 accesses user data repository 170 to retrieve syntax information for the syntax fields. For example, user data repository 170 may include an email address for "John Hamilton" in a list of common contacts for the user. In this example, user data repository includes an email address of jhamilton@email.com that is associated with the name John Hamilton. Syntax generator 168 retrieves the jhamilton@email.com syntax information and inserts it into the recipient name syntax field.

Incomplete fields module 172 determines incomplete syntax fields, which may be syntax fields associated with no syntax information. Incomplete fields module 172 generates a notification event to notify the user of an incomplete syntax field. In an example, the notification event includes an event to highlight the incomplete syntax field. In another example, the notification event includes an event to place graphics (e.g., visual representations of bubbles) around the incomplete syntax field. User interface ("UI") generator 174 receives the syntax action from syntax generator 169 and the notification events from incomplete fields module 172. Based on the syntax action and the notification events, UI generator 174 generates a GUI that displays the syntax action and the notification events to highlight the incomplete syntax fields.

In the GUI, syntax fields (e.g., complete syntax fields) are associated with links (e.g, hyperlinks, link 274 in FIG. 7, and so forth), selection of which enables a user to edit the syntax information in the syntax fields. In the GUI, the incomplete syntax fields are also associated with links, selection of which enables a user to enter or to speak syntax information for the incomplete syntax fields. When a user edits or speaks voice input information for a syntax field, display manager 148 records a location of the syntax field in a GUI for which additional information is being spoken and/or edited. The links in the GUI are associated with a syntax field, for which voice input may be edited. Accordingly, when a user selects a link, display manger 148 records the syntax field for which voice input is edited.

Input editor 152 passes voice input information (with the associated syntax field) to editing voice input server 106. Using the techniques described herein, the voice input is processed by request processor 158 and converted to a text file by speech-to-text converter 160. Based on an identity of a selected link, syntax generator 168 determines a correspondence between the syntax information included in the text field and the syntax fields of the syntax action. Syntax generator 168 extracts syntax information from the text file and populates syntax fields with the appropriate syntax information. In an example, syntax generator 168 generates an updated syntax action by accessing an Extensible Markup Language ("XML") file that includes tags corresponding to the various syntax fields and that also includes text corresponding to the text included in the syntax action. Syntax generator 168 generates an updated syntax action and passes the updated syntax action to UI generator 174. UI generator 174 generates an updated GUI and sends it to client device 102.

In an example, syntax templates include XML files that are defined by application providers. These XML files define syntax actions for applications. In this example, syntax template data repository 166 stores the XML files and syntax generator 168 generates a syntax action by populating and/or editing syntax fields in the XML files with appropriate syntax information.

Figure 3:
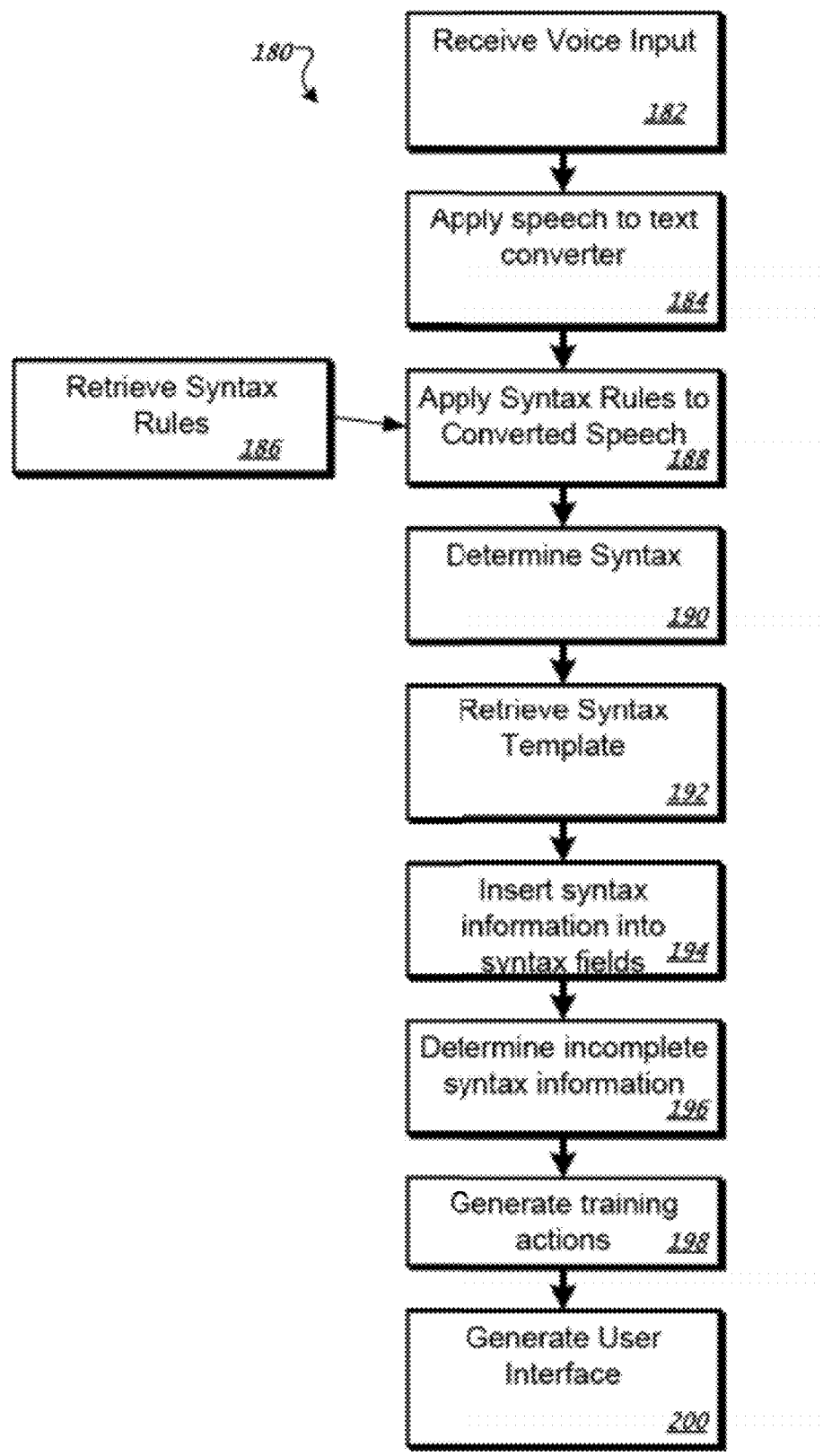
FIG. 3 is a flowchart of a process executed by the system for using voice input to perform an action.

FIG. 3 is a flowchart of process 180 executed by system 100 for using voice input to perform an action. Editing voice input server 106 receives (182) voice input (e.g., from client device 102) and applies (184) speech-to-text converter 160 to generate a text file corresponding to the voice input. In an example, editing voice input server 106 receives voice input to perform an action, e.g., to send an email. In another example, editing voice input server 106 receives voice input to edit syntax information of a syntax field, e.g., "change email recipient from John Hamilton to Mike Madermott". Editing voice input server 106 retrieves (186) syntax rules, e.g., from syntax rules data repository 164. Editing voice input server 106 applies (188), e.g., through rules engine 162, the syntax rules to information in the text file. By comparing information in the text file to the syntax rules, editing voice input server 106 determines (190) an appropriate syntax action and retrieves (192) a syntax template, e.g., from syntax template data repository 166.

Editing voice input server 106 determines (192) syntax information included in the text file and inserts (194) the syntax information into corresponding syntax fields. Editing voice input server 106 determines (196), e.g., through incomplete fields module 172, incomplete syntax fields associated with the syntax action. Editing voice input server 106 generates (198) training actions to train a user to provide information for the incomplete syntax fields. In an example, the training actions include notification events that provide visual notifications of the incomplete syntax fields of the syntax action. In another example, the training actions include a message that audibly prompts a user of client device 102 to enter in information for incomplete syntax fields.

In an example, a user speaks the phrase "send email" into a microphone on client device 102. In this example, the user's mobile device executes training actions of playing a "to whom?" audio message that prompts the user to provide additional voice input indicating to whom the email should be sent. That is, editing voice input server 106 generates training actions to "train" a user how to provide a complete voice command to perform an action.

Editing voice input server 106 generates (200) a GUI to display for a user of client device 102. The GUI includes visual representation of the syntax fields, which are populated with syntax information, and of the training actions. Editing voice input server 106 also generates (200) audio files corresponding to training actions, as described herein, and sends the audio files to client device 102.

Figure 4:
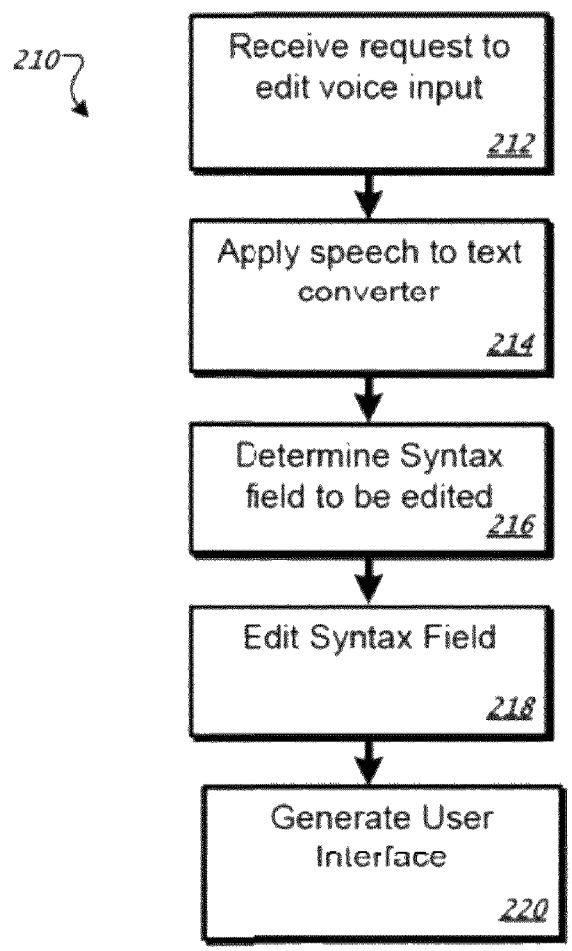
FIG. 4 is a flowchart of a process used by the system for editing voice input.

FIG. 4 is a flowchart of process 210 executed by system 100 for editing voice input. Editing voice input server 106 receives (212) a request to edit voice input, for example, from client device 102 (FIG. 1). In an example, the request to edit voice input is generated by client device 102 by a user selecting a link (e.g., link 274 in FIG. 7) to edit a syntax field of a syntax action. The request to edit voice input includes an audio file with data corresponding to the words spoken by the user. Also, as previously addressed, the request to edit voice input also includes an identifier corresponding to the link associated with the syntax field for which the voice input is edited. Editing voice input server 106 applies (214) speech to text converter 160 to generate a text file for the edited voice input. The text file includes the identifier corresponding to the link associated with the syntax field. Based on the identifier corresponding to the link associated with the syntax field, editing voice input server 106 determines (216) the syntax field for which voice input is edited. Editing voice input server 106 edits (218) the appropriate syntax field by inserting text corresponding to the edited voice input into the syntax field. Editing voice input server 106 generates (220) an updated GUI, e.g., through UI generator 174, with the updated syntax fields.

Figure 5:
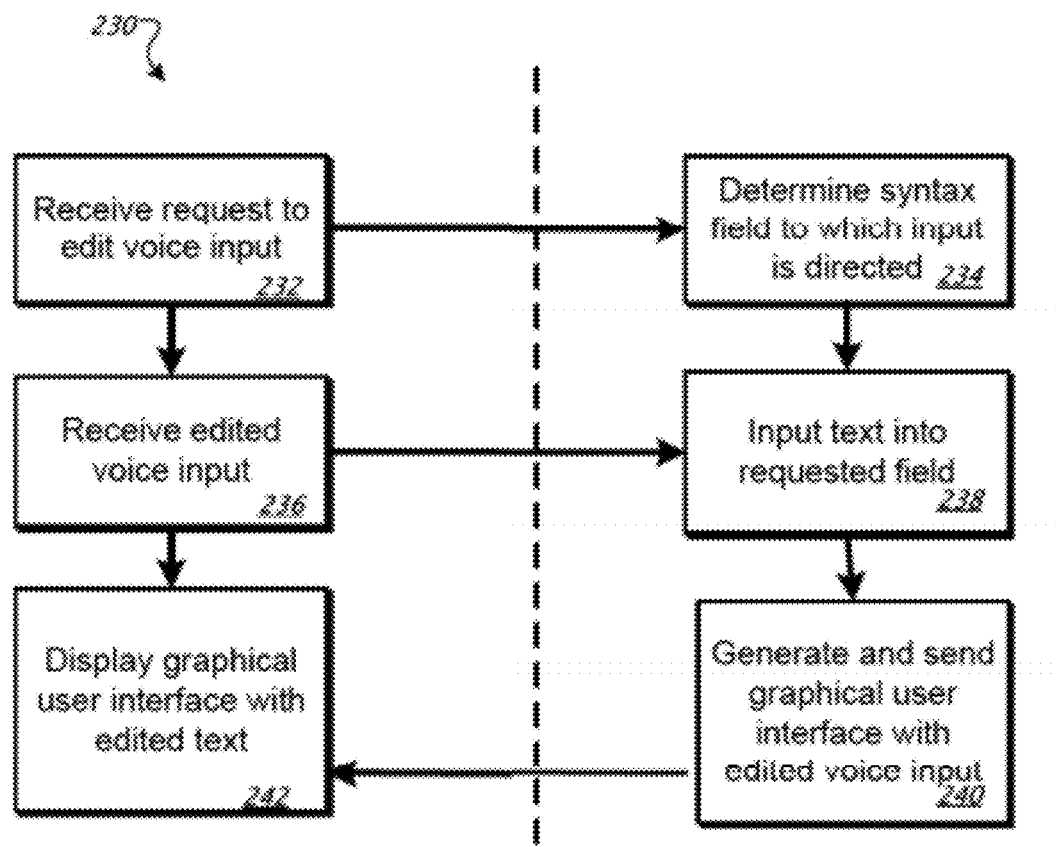
FIG. 5 is a swim lane diagram of a process by which a client device interfaces with a server system to send edited voice input.

FIG. 5 is a swim lane diagram of process 230 by which client device 102 interfaces with editing voice input server 106 to send edited voice input. Client device 102 receives a request to edit voice input, for example by a user selecting a link associated with a syntax field. Client device 102 passes the request to edit voice input to editing voice input server 106. Editing voice input server 106 determines (234) the syntax field to which the request to edit voice input is directed using the techniques described herein. Client device 102 receives (236) the edited voice input, e.g., through a microphone associated with client device 102. Client device 102 passes the edited voice input to editing voice input server 106. Editing voice input server 106 converts the edited voice input to corresponding text and inserts (238) the corresponding text into the appropriate syntax fields. For example, editing voice input server 106 inserts (238) the edited voice input into the appropriate syntax field by updating a syntax field in an XML file with text corresponding to the edited voice input. Editing voice input server 106 generates and sends (240) an updated GUI including text corresponding to the edited voice input to client device 102. For example, editing voice input server 106 generates and sends (240) the updated GUI by sending client device 102 an updated XML file. Client device 102 displays (144) the updated GUI including the edited voice input.

Figure 6:
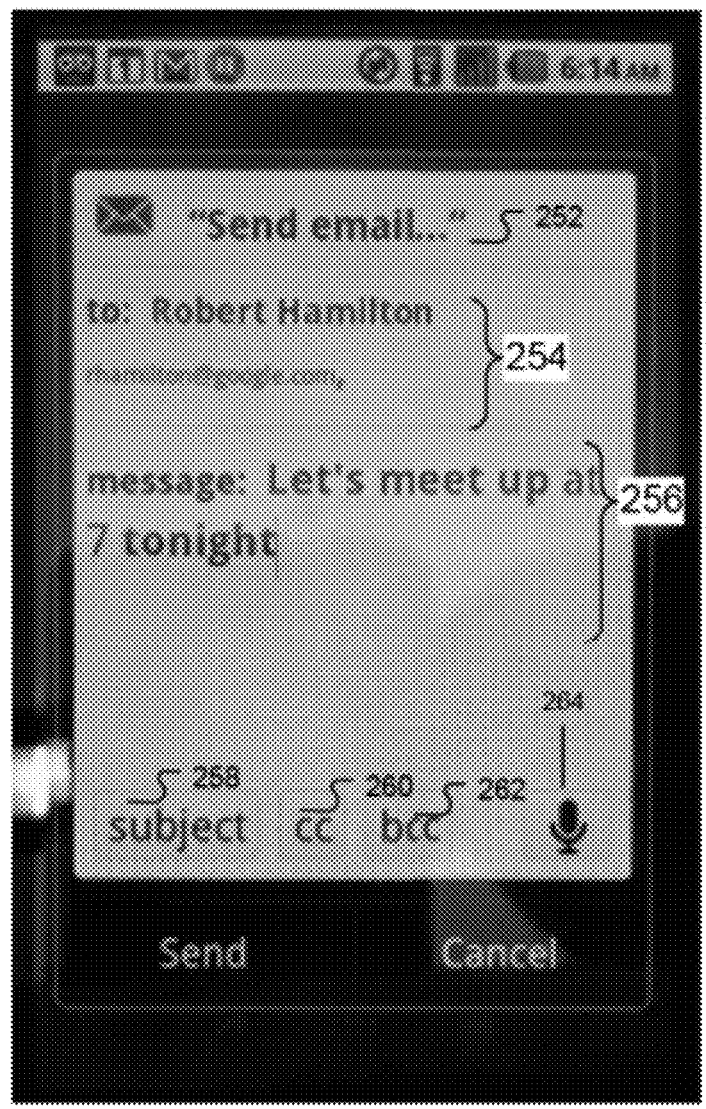
FIGS. 6-8 are examples of GUIs generated by the system and displayed on a client device.

FIG. 6 is an example of GUI 250 generated by system 100 and displayed on client device 102. In this example, a user provides the following initial voice input: "Send email message to Robert Hamilton with the message let's meet up tonight." Based on the initial voice input, editing voice input server 106 determines a syntax action of "send email" and populates the "to" syntax field with syntax information corresponding to "Robert Hamilton, rhamilton@email.com", using the techniques described herein. Additionally, based on the initial voice input, editing voice input server 106 populates the "message" syntax field with "let's meet up at 7 tonight" syntax information. Editing voice input server 106 generates GUI 250 based on the type of syntax action and syntax information corresponding to syntax fields. GUI 250 includes section 252, which includes information indicative of the type of syntax action the user has requested be performed. GUI 250 also includes section 254, which displays the syntax information associated with the "to" syntax field. GUI 250 also includes section 256, which displays the syntax information associated with the "message" syntax field. GUI 250 includes link 264 selection of which allows a user to provide edited voice input for the "message" syntax field and/or for the "to" syntax field.

In the illustrative example of FIG. 6, the "subject" syntax field, the "cc" syntax field, and the "bcc" syntax field are incomplete syntax fields. GUI 250 includes link 258 corresponding to the "subject" syntax field, link 260 corresponding to the "cc" syntax field, and link 262 corresponding to the "bcc" syntax field. Selection of links 258, 260, 262 allows a user of client device 102 to provide voice input for the "subject," "cc," and/or "bcc" syntax fields.

Figure 7:
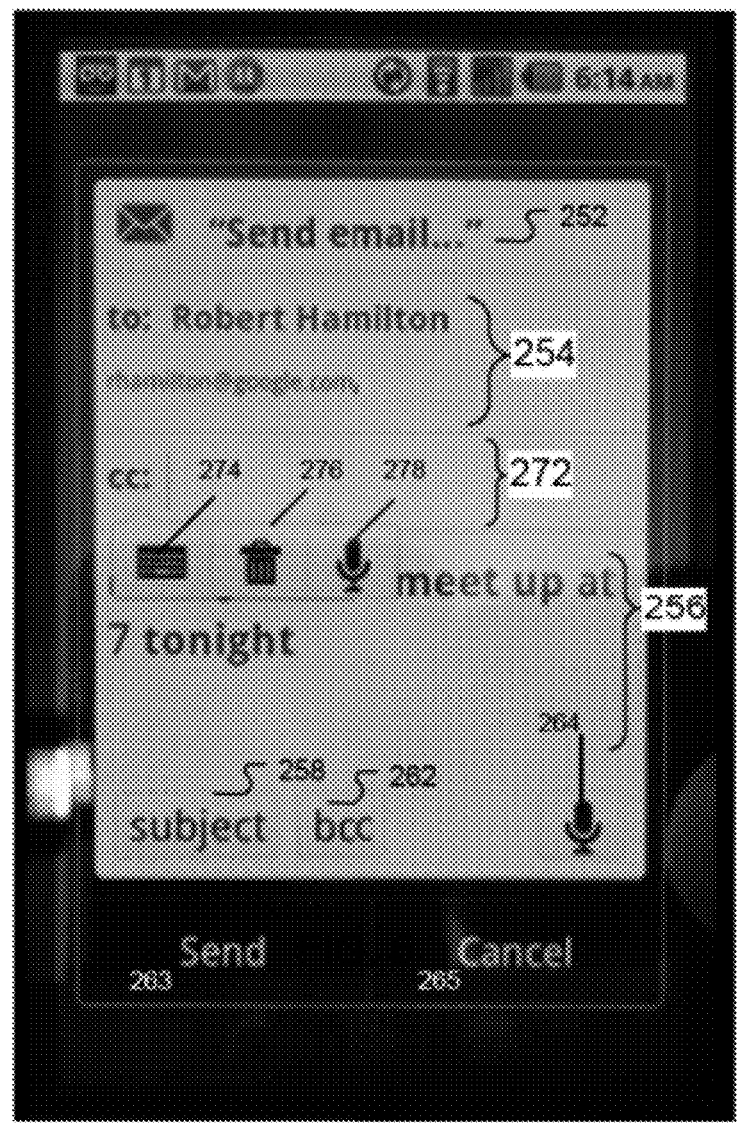

FIG. 7 is an example of GUI 270 generated by system 100 and displayed on client device 102. In this example, a user of client device 102 selects link 260, corresponding to the "cc" syntax field. Through selection of link 260, section 272 of GUI 270 includes a visual representation of the "cc" syntax field. The visual representation of the "cc" syntax fields are juxtaposed to links 274, 276, 278. Selection of link 274 enables a user to use a keyboard associated with client device 102 to provide text input for the "cc" syntax field. Selection of link 278 enables a user to use a microphone associated with client device 102 to provide voice input for the "cc" syntax field. Through selection of link 263, a user sends entered voice input to editing voice input server 106. Through selection of link 265, a user cancels the sending of voice input to editing voice input server 106. Selection of link 276 enables a user to remove or to delete the "cc" syntax field from the syntax action. GUI 270 also includes links 258, 262 to provide the user with a visual indication that the "subject" syntax field and the "bcc" syntax field include incomplete syntax fields.

Figure 8:
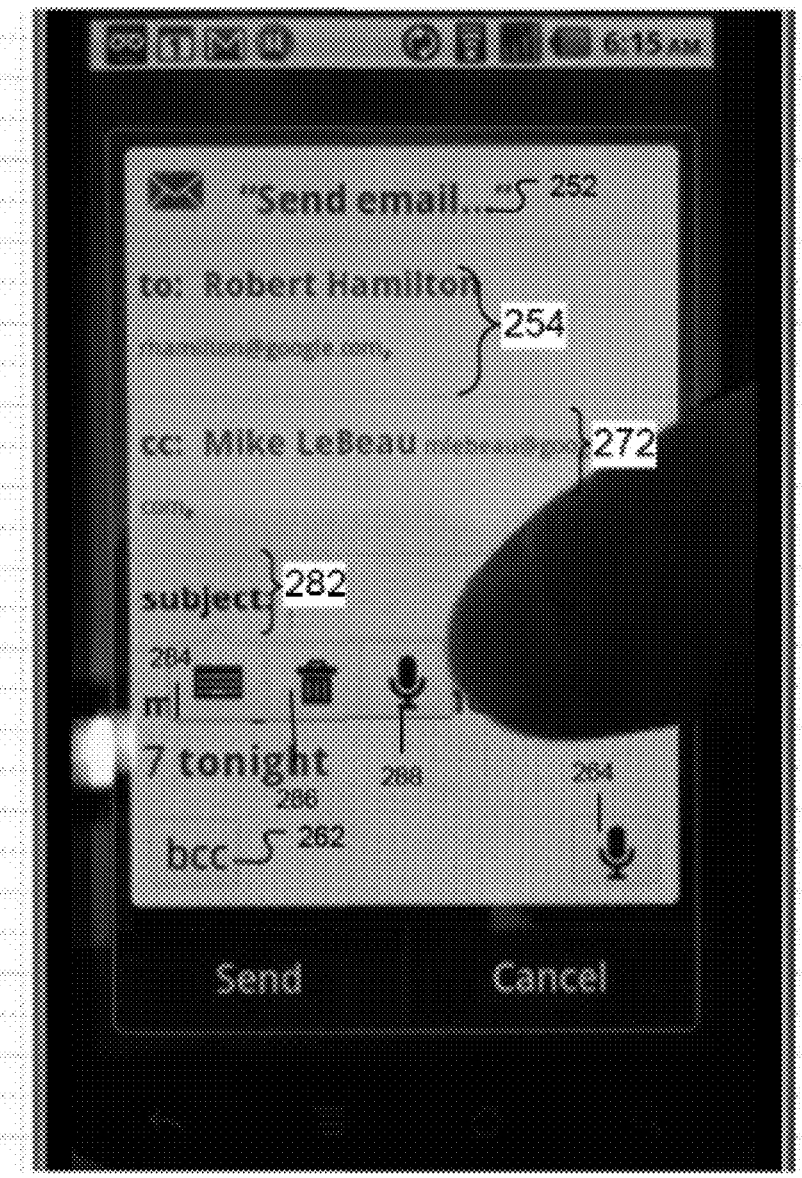

FIG. 8 is an example of GUI 280 generated by system 100 and displayed on client device 102. In this example, a user of client device 102 selects link 278 (FIG. 7) and provides voice input for the "cc" syntax field 272. Using the techniques described herein, the voice input is sent to the editing voice input server 106, which updates the GUI and/or XML file with the voice input and sends the updated GUI and/or XML file to the client device 102.

Additionally, the user selects link 258 (FIG. 7), corresponding to the "subject" syntax field. Through selection of link 258, section 282 of GUI 270 includes a visual representation of the "subject" syntax field. The visual representation of the "subject" syntax field is juxtaposed to links 284, 286, 288. Selection of link 284 enables a user to use a keyboard associated with client device 102 to provide text input for the "subject" syntax field. Selection of link 288 enables a user to use a microphone associated with client device 102 to provide voice input for the "subject" syntax field. Selection of link 286 enables a user to remove or to delete the "subject" syntax field from the syntax action. GUI also includes links 262 to provide the user with a visual indication that the "bcc" syntax field includes incomplete syntax fields.

Figure 9:
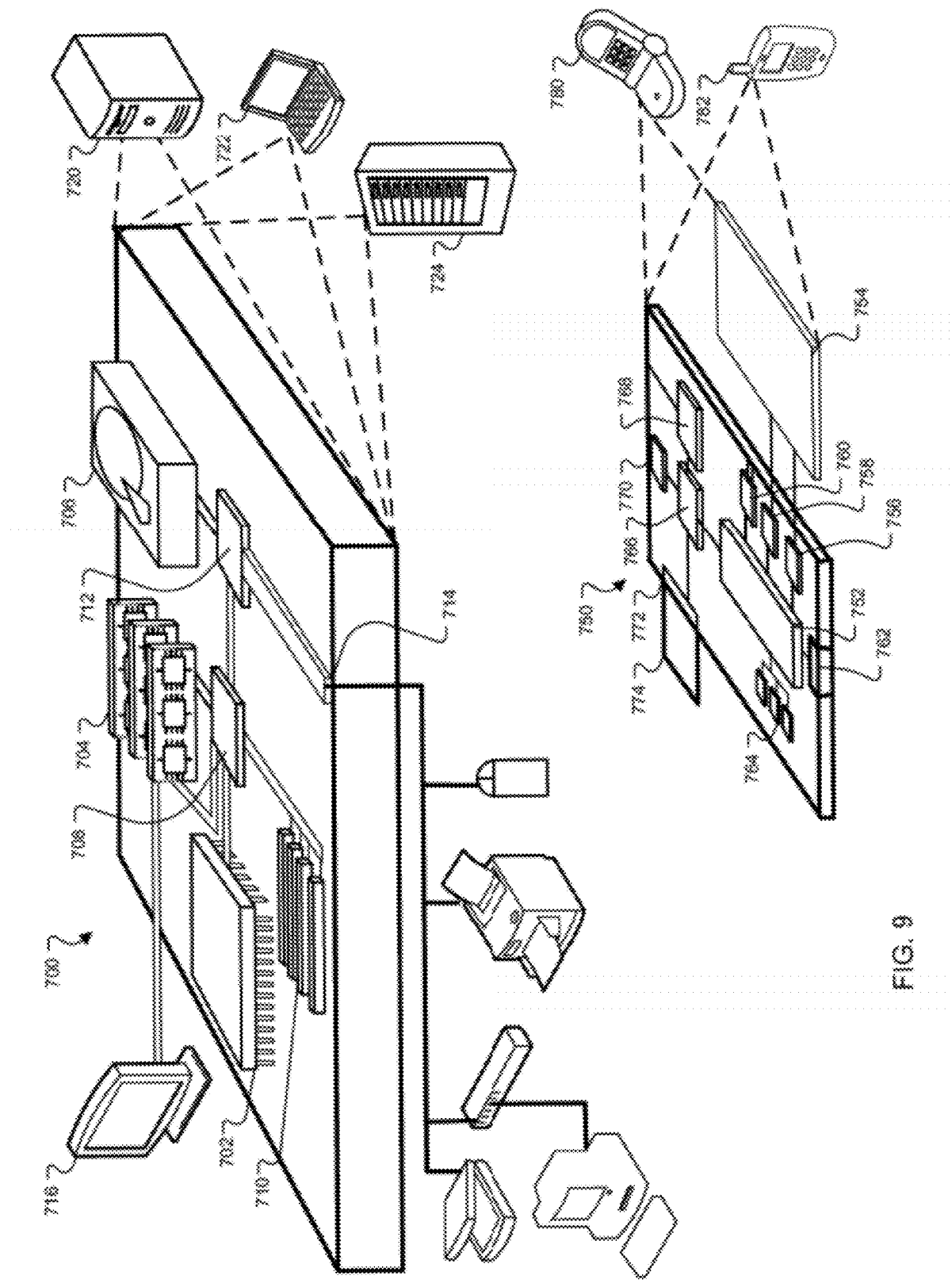
FIG. 9 shows an example of a computer device and a mobile computer device that can be used to implement the techniques described herein.

FIG. 9 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, and so forth) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, the configuration of the system may be the same as in FIG. 2, except that client device 102 performs speech-to-text conversion and passes editing voice input server 106 a text file with information corresponding to voice input.

In another implementation, editing voice input server 106 determines a syntax field corresponding to voice input and sends client device 102 information indicative of the text corresponding to voice input and the syntax field. Client device 102 updates an XML file, host on client device 102, by inserting into the appropriate syntax field, text corresponding to the voice input.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although a few implementations have been described in detail above, other modifications are possible. Moreover, other mechanisms for editing voice may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other embodiments not specifically described herein are also within the scope of the following claims.

What is claimed is:

1. A method comprising:
   receiving, by a processing device, a voice request to perform an action, wherein the voice request comprises first audio information associated with the action;
   generating, by the processing device, information for a GUI that when rendered on a display device renders a prompt message prompting a user to speak second audio information associated with the action;
   determining, based on the voice request, a syntax format to be used in performing the action, wherein the syntax format comprises one or more data fields;
   generating syntax information, with the syntax information at least partly based on one or more of (i) the first audio information, and (ii) the second audio information;
   inserting, by the processing device into the one or more data fields, the syntax information;
   determining, based on inserting, one or more incomplete data fields; and
   generating, based on the one or more incomplete data fields, one or more training actions to train the user to speak a complete syntax associated with the action.

2. The method of claim 1, further comprising:
   determining that the first audio information comprises a partial set of information for the one or more data fields.

3. The method of claim 1, further comprising:
   receiving, in response to the one or more training actions, third audio information; and
   determining that the first audio information, the second audio information and the third audio information comprise a complete set of information for the one or more data fields.

4. The method of claim 1, further comprising:
   retrieving, from a data repository, one or more syntax rules;
   applying the one or more syntax rules to the syntax information; and
   generating, based on applying, a mapping between the one or more data fields and the syntax information.

5. The method of claim 1, wherein the GUI comprises a first GUI, and wherein at least one of the one or more training actions comprise information for a second GUI that when rendered on the display device renders a highlighted visual representation of at least one of the one or more incomplete data fields.

6. The method of claim 1, further comprising:
retrieving a template for performance of the action, wherein the template comprises an ordering of the one or more data fields.

7. One or more non-transitory machine-readable media configured to store instructions that are executable by one or more processing devices to perform operations comprising:
receiving a voice request to perform an action, wherein the voice request comprises first audio information associated with the action;
generating information for a GUI that when rendered on a display device renders a prompt message prompting a user to speak second audio information associated with the action;
determining, based on the voice request, a syntax format to be used in performing the action, wherein the syntax format comprises one or more data fields;
generating syntax information, with the syntax information at least partly based on one or more of (i) the first audio information, and (ii) the second audio information;
inserting, into the one or more data fields, the syntax information;
determining, based on inserting, one or more incomplete data fields; and
generating, based on the one or more incomplete data fields, one or more training actions to train the user to speak a complete syntax associated with the action.

8. The one or more non-transitory machine-readable media of claim 7, wherein the operations further comprise:
determining that the first audio information comprises a partial set of information for the one or more data fields.

9. The one or more non-transitory machine-readable media of claim 7, wherein the operations further comprise:
receiving, in response to the one or more training actions, third audio information; and
determining that the first audio information, the second audio information and the third audio information comprise a complete set of information for the one or more data fields.

10. The one or more non-transitory machine-readable media of claim 7, wherein the operations further comprise:
retrieving, from a data repository, one or more syntax rules;
applying the one or more syntax rules to the syntax information; and
generating, based on applying, a mapping between the one or more data fields and the syntax information.

11. The one or more non-transitory machine-readable media of claim 7, wherein the GUI comprises a first GUI, and wherein at least one of the one or more training actions comprise information for a second GUI that when rendered on the display device renders a highlighted visual representation of at least one of the one or more incomplete data fields.

12. The one or more non-transitory machine-readable media of claim 7, wherein the operations further comprise:
retrieving a template for performance of the action, wherein the template comprises an ordering of the one or more data fields.

13. An electronic system comprising:
one or more processing devices; and
one or more machine-readable media configured to store instructions that are executable by the one or more processing devices to perform operations comprising:
receiving a voice request to perform an action, wherein the voice request comprises first audio information associated with the action;
generating information for a GUI that when rendered on a display device renders a prompt message prompting a user to speak second audio information associated with the action; and
determining, based on the voice request, a syntax format to be used in performing the action, wherein the syntax format comprises one or more data fields;
generating syntax information, with the syntax information at least partly based on one or more of (i) the first audio information, and (ii) the second audio information;
inserting, into the one or more second data fields, the syntax information;
determining, based on inserting, one or more incomplete data fields; and
generating, based on the one or more incomplete data fields, one or more training actions to train the user to speak a complete syntax associated with the action.

14. The electronic system of claim 13, wherein the operations further comprise:
determining that the first audio information comprises a partial set of information for the one or more data fields.

15. The electronic system of claim 13, wherein the devices to operations further comprise:
receiving, in response to the one or more training actions, third audio information; and
determining that the first audio information, the second audio information and the third audio information comprise a complete set of information for the one or more data fields.

16. The electronic system of claim 13, wherein the operations further comprise:
retrieving, from a data repository, one or more syntax rules;
applying the one or more syntax rules to the syntax information; and
generating, based on applying, a mapping between the one or more data fields and the syntax information.

17. The electronic system of claim 13, wherein the GUI comprises a first GUI, and wherein at least one of the one or more training actions comprise information for a second GUI that when rendered on the display device renders a highlighted visual representation of at least one of the one or more incomplete data fields.

18. The electronic system of claim 13, wherein the operations further comprise:
retrieving a template for performance of the action, wherein the template comprises an ordering of the one or more data fields.

19. An electronic system comprising:
a voice editor manager configured to:
receive and a voice request to perform an action, wherein the voice request comprises first audio information associated with the action;
means for generating information for a GUI that when rendered on a display device renders a prompt message prompting a user to speak second audio information associated with the action;
means for determining, based on the voice request, a syntax format to be used in performing the action, wherein the syntax format comprises one or more data fields;
means for generating syntax information, with the syntax information at least partly based on one or more of (i) the first audio information, and (ii) the second audio information;

means for inserting, into the one or more data fields, the syntax information;

means for determining, based on inserting, one or more incomplete data fields; and means for generating, based on the one or more incomplete data fields, one or more training actions to train the user to speak a complete syntax associated with the action.

20. The electronic system of claim 19, further comprising:

means for determining that the first audio information comprises a partial set of information for the one or more data fields.

21. The electronic system of claim 19, further comprising:

means for receiving, in response to the one or more training actions, third audio information; and means for determining that the first audio information, the second audio information and the third audio information comprise a complete set of information for the one or more data fields.

22. The electronic system of claim 19, further comprising:

means for retrieving, from a data repository, one or more syntax rules;

means for applying the one or more syntax rules to the syntax information; and means for generating, based on applying, a mapping between the one or more data fields and the syntax information.

23. The electronic system of claim 19, wherein the GUI comprises a first GUI, and wherein at least one of the one or more training actions comprise information for second GUI that when rendered on the display device renders a highlighted visual representation of at least one of the one or more incomplete data fields.

24. The electronic system of claim 19, further comprising:

means for retrieving a template for performance of the action, wherein the template comprises an ordering of the one or more data fields.

* * * * *

UNITED STATES PATENT AND TRADEMARK OFFICE
CERTIFICATE OF CORRECTION

PATENT NO. : 8,244,544 B1  
APPLICATION NO. : 13/248849  
DATED : August 14, 2012  
INVENTOR(S) : Michael J. LeBeau, John Nicholas Jitkoff and William J. Byrne Page 1 of 1

It is certified that error appears in the above-identified patent and that said Letters Patent is hereby corrected as shown below:

In Column 16, Line 4, Claim 13, after "action;" delete "and".

In Column 16, Lines 24-25, Claim 15, after "the" delete "devices to".

Signed and Sealed this
Fourth Day of December, 2012

David J. Kappos
*Director of the United States Patent and Trademark Office*